(12) United States Patent
Qi

(10) Patent No.: US 8,599,448 B2
(45) Date of Patent: Dec. 3, 2013

(54) FULL SPECTRUM RECOGNITION IMAGE SENSOR

(75) Inventor: Wuchang Qi, Shandong (CN)

(73) Assignee: Weihai Hualing Opto-Electronics Co., Ltd., Shandong (CN)

( * ) Notice: Subject to any disclaimer, the term of this patent is extended or adjusted under 35 U.S.C. 154(b) by 161 days.

(21) Appl. No.: 13/255,055

(22) PCT Filed: Dec. 4, 2009

(86) PCT No.: PCT/CN2009/075313
§ 371 (c)(1),
(2), (4) Date: Sep. 6, 2011

(87) PCT Pub. No.: WO2011/044739
PCT Pub. Date: Apr. 21, 2011

(65) Prior Publication Data
US 2012/0002250 A1 Jan. 5, 2012

(30) Foreign Application Priority Data

Oct. 16, 2009 (CN) .......................... 2009 1 0207369

(51) Int. Cl.
*H04N 1/04* (2006.01)

(52) U.S. Cl.
USPC ........... 358/475; 358/474; 358/509; 358/501; 382/275

(58) Field of Classification Search
USPC .......... 358/474, 475, 509, 505, 501; 382/254, 382/275
See application file for complete search history.

(56) References Cited

U.S. PATENT DOCUMENTS 5,946,017 A * 8/1999 Carley ........................... 347/115
6,611,716 B2 * 8/2003 Chow et al. ..................... 607/54

(Continued)

FOREIGN PATENT DOCUMENTS

CN 2537061 Y 2/2003
CN 1430770 A 7/2003

(Continued)

OTHER PUBLICATIONS

International Search Report of PCT/CN2009/075313, date of mailing Jul. 22, 2010.

*Primary Examiner* — Negussie Worku
(74) *Attorney, Agent, or Firm* — Westerman, Hattori, Daniels & Adrian, LLP

(57) ABSTRACT

The present invention discloses an image sensor, specifically a full spectrum recognition image sensor capable of reading and recognition image information for all of ultraviolet light, visible light and infrared light, which comprises a sensor substrate, photosensitive parts set on the sensor substrate and arranged in a straight line, a lens set on an upper portion of the sensor substrate, a light source set beside the lens, and a framework capable of accommodating said sensor substrate, said lens and said light source. A light-transmitting plate for carrying an original is set on an upper portion of the framework, the light source is a full spectrum light source capable of emitting light including ultraviolet light, visible light and infrared light, and the photosensitive parts on the sensor substrate consist of two parts, one part of which is a reflected light photosensitive part for receiving reflected light information generated by irradiating an original with the light source and another part of which is an exciting light photosensitive part for receiving exciting light information generated by irradiating an original with the light source. The image sensor of the present invention not only can recognize general color images, but also can recognize forgery-prevention images for various special purposes, and thus greatly improve the functions and the application field of the image sensor.

7 Claims, 4 Drawing Sheets

(56) References Cited

U.S. PATENT DOCUMENTS

| | | | |
|---|---|---|---|
| 6,720,560 B1* | 4/2004 | Edgar et al. | 250/341.8 |
| 7,092,013 B2* | 8/2006 | Bacarella et al. | 348/217.1 |
| 7,283,658 B2* | 10/2007 | Maruya | 382/144 |
| 7,349,104 B2* | 3/2008 | Geng | 356/603 |
| 7,535,504 B2* | 5/2009 | Frame et al. | 348/272 |
| 8,310,737 B2* | 11/2012 | Nagao et al. | 358/475 |
| 2005/0078851 A1 | 4/2005 | Jones et al. | |

FOREIGN PATENT DOCUMENTS

| | | |
|---|---|---|
| CN | 201323623 Y | 10/2009 |
| JP | 2000-182032 A | 6/2000 |

* cited by examiner

FULL SPECTRUM RECOGNITION IMAGE SENSOR

FIELD OF THE INVENTION

The present invention relates to an image sensor, specifically, to a full spectrum recognition image sensor capable of reading and recognition image information for all of ultraviolet light, visible light and infrared light.

BACKGROUND OF THE INVENTION

FIG. 7 is a cross-section diagram of an existing image reading apparatus. In the figure, 1 is a light source for emitting light; 2 is a lens; 3 is a photosensitive part (photosensitive integrated circuits) for receiving light converged by lens 2; 4 is a sensor substrate for carrying the photosensitive integrated circuits 3 arranged in a straight line; 6 is a framework for accommodating the light source 1, the lens 2 and the sensor substrate 4; 5 is a light-transmitting plate for carrying an original, which is set on framework 6; and 10 is an original.

In the above image reading apparatus, light emitted from the light source 1 transmits through the light-transmitting plate 5, and is irradiated onto the original 10 outside. On the black area of text on the original 10, light is absorbed, and on other areas of white background for the original, almost 100% of the light is reflected. Then the reflected light passes through the glass plate 5, is collected by the lens 2, and is irradiated onto the photosensitive part 3 on the sensor substrate 4. The photosensitive part 3 is composed of many photosensitive pixels, and a driving circuit capable of photoelectrically converting light irradiated onto each photosensitive pixel and outputting signals. The received light, after being converted into electrical signals, is output outward via the driving circuit as image (text) information. The original is moved uninterruptedly, and thus the image (text) information recorded thereon is read out continuously.

There are the following problems in regard to the above image reading apparatus. When the reflected light information of the original is required to be read, both of the light source and the photosensitive part need to be configured to be in a state suited to read the reflected light. Thus at this time, information of exciting light in the original cannot be read. When information of exciting light is required to be read, the light source and the photosensitive part need to be configured to be in a state suited to read the exciting light. Thus at this time, the reflected light information cannot be read. When both reflected light information and exciting light information are required to be read and recognized, a plurality of different types of sensors need to be used. In result, the cost and volume of the image reading apparatus increase, and the subsequent processing section of data thereof is quite complex. These have a strong impact on the application field of the image sensor, and limit the development of the product.

SUMMARY OF THE INVENTION

Technical Problem

The purpose of the present invention is to overcome the shortcomings in the prior art, and provide a full spectrum recognition image sensor capable of not only reading reflected light information but also reading exciting light information.

Technical Solution

A full spectrum recognition image sensor comprises a sensor substrate, photosensitive parts set on the sensor substrate and arranged in a straight line, a lens set on an upper portion of the sensor substrate, a light source set beside the lens, and a framework capable of accommodating said sensor substrate, said lens and said light source, wherein a light-transmitting plate for carrying an original is set on an upper portion of the framework, the light source is a full spectrum light source capable of emitting light including ultraviolet light, visible light and infrared light, and the photosensitive parts on the sensor substrate consist of two parts, one part of which is a reflected light photosensitive part for receiving reflected light information generated by irradiating an original with the light source, and another part of which is an exciting light photosensitive part for receiving exciting light information generated by irradiating an original with the light source.

The visible light in the full spectrum light source in the present invention can be white light, also can be visible light with a single wavelength, or be visible light with a variety of different wavelengths. A separate control electrode is set for light of every wavelength in the spectrum light source. By applying a certain amount of voltage to the control electrode corresponding to light of this wavelength, light emission control can be independently performed on light of this wavelength.

The reflected light photosensitive part receives the reflected image information generated when an original is irradiated by visible light or infrared light. The exciting light photosensitive part receives exciting light image information generated when an original is irradiated by ultraviolet light.

In the present invention, an ultraviolet light filter film is coated on the surface of the exciting light photosensitive part, so as to obtain clear image information of exciting light.

Advantageous Effects

The effect of the present invention is in that not only the reflected light information of an original but also the exciting light information of the original can be read, by using one sensor. This greatly improves the functions of the sensor, thus enabling the image sensor to be developed and applied better in the forgery-prevention detection field.

DESCRIPTION OF THE EMBODIMENTS

The present invention is described in detail below with reference to the drawings.

Embodiment 1

Figure 1:
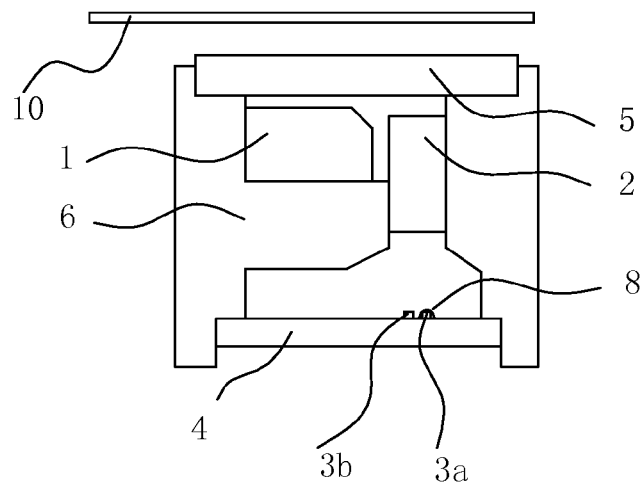
FIG. 1 is one kind of cross-section structure schematic diagram of the present invention.
Figure 2:
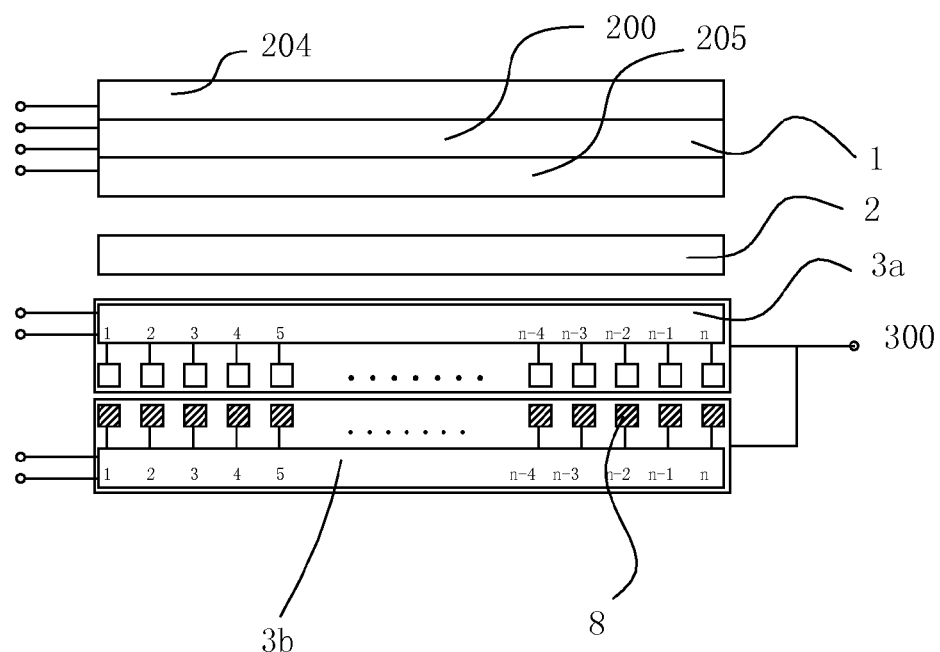
FIG. 2 is a schematic diagram of internal structure of FIG. 1.

FIG. 1 is the cross-section structure diagram of Embodiment 1 of the present invention. FIG. 2 is the schematic diagram of internal structure of FIG. 1. In the figures, 1 is a full spectrum light source capable of emitting ultraviolet light, visible light and infrared light; 2 is a lens; 3a is a reflected light photosensitive part for receiving light converged by lens 2; 3b is an exciting light photosensitive part for receiving light converged by lens 2; 4 is a sensor substrate for carrying the reflected light photosensitive part 3a and the exciting light photosensitive part 3b which are arranged in a straight line; 6 is a framework for accommodating the light source 1, the lens 2, and the sensor substrate 4; 5 is a light-transmitting plate which is set on the framework 6 to carry an original object; 8 is an ultraviolet light filter film coated on 3b; and 10 is the original object (hereinafter "the original").

Figure 3:
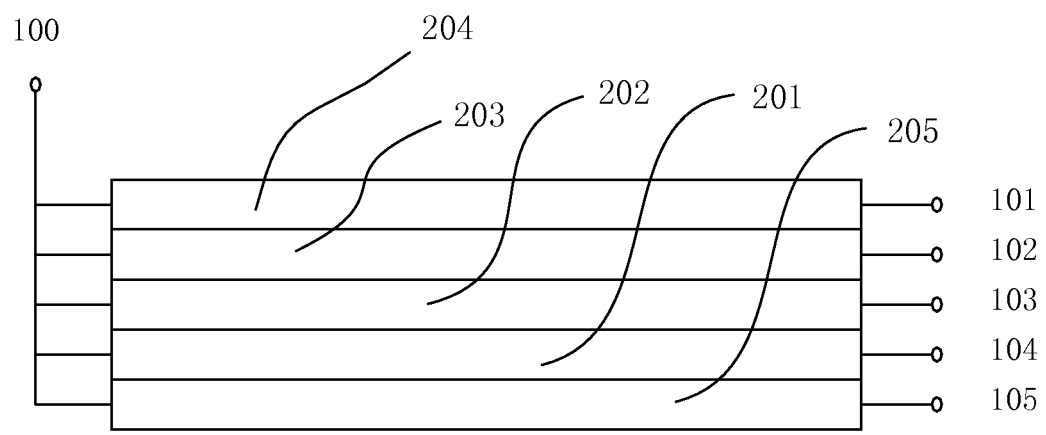
FIG. 3 is a schematic diagram of light source structure of Embodiment 1 of the present invention.
Figure 4:
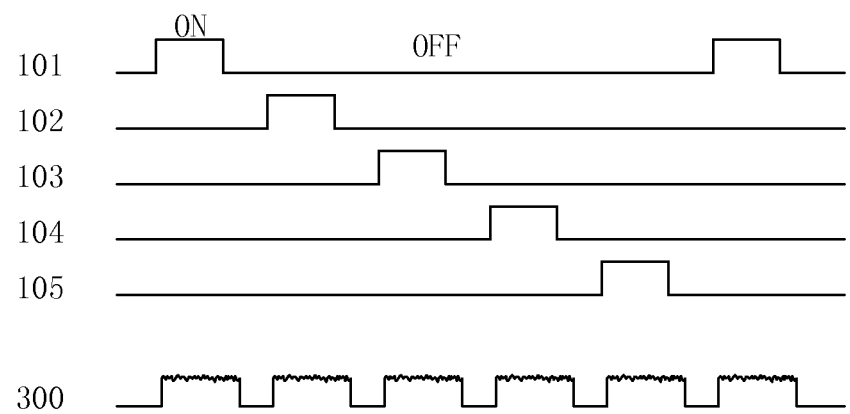
FIG. 4 is an effect diagram of Embodiment 1 of the present invention.

In the above image reading apparatus, the light source 1 is a full spectrum light source capable of emitting ultraviolet light 204, visible light 200 and infrared light 205, wherein the visible light is tricolor visible light (red light 201, green light 202 and blue light 203). The structure of the light source is shown in FIG. 3, wherein 100 is a common electrode of the light source, 101 is an ultraviolet light control electrode, 102 is a blue light control electrode, 103 is a green light control electrode, 104 is a red light control electrode, and 105 is an infrared light control electrode. That is, a light emission control can be independently performed on light of every wavelength, and since it is the same as the prior art, the description thereof will be omitted herein. By applying a certain amount of voltage to different light emission electrodes of the light source 1, the light source 1 can be caused to emit light with different wavelengths. The light transmits through the light-transmitting plate 5, and is irradiated onto the original 10 outside. When the visible light 200 (red light 201, green light 202 or blue light 203) in the light source is illumined, the reflected light photosensitive part is also turned on simultaneously. The surface reflected light of the original 10 passes through the lens to enter into the reflected light photosensitive part, and is converted into electrical signals to be transferred outward. When the infrared light 205 in the light source is illumined, the reflected light photosensitive part is also turned on simultaneously. The internal reflected light of the original 10 passes through the lens to enter into the reflected light photosensitive part too, and is converted into electrical signals to be transferred outward. When the ultraviolet light 204 in the light source is illumined, the exciting light photosensitive part is turned on at this time. The exciting light generated by irradiating the original 10 with the ultraviolet light 204, passes through the lens to enter into the exciting light photosensitive part, and is converted into electrical signals to be transferred outward. FIG. 4 is a schematic diagram of the corresponding output signals when light of different colors in the light source is illumined. Every time one light is turned on, photoelectrically converted signals corresponding to this light are generated in output signals 300. Thus, surface image information, internal image information and information of exciting light of the original, all can be read by using the same sensor.

Figure 5:
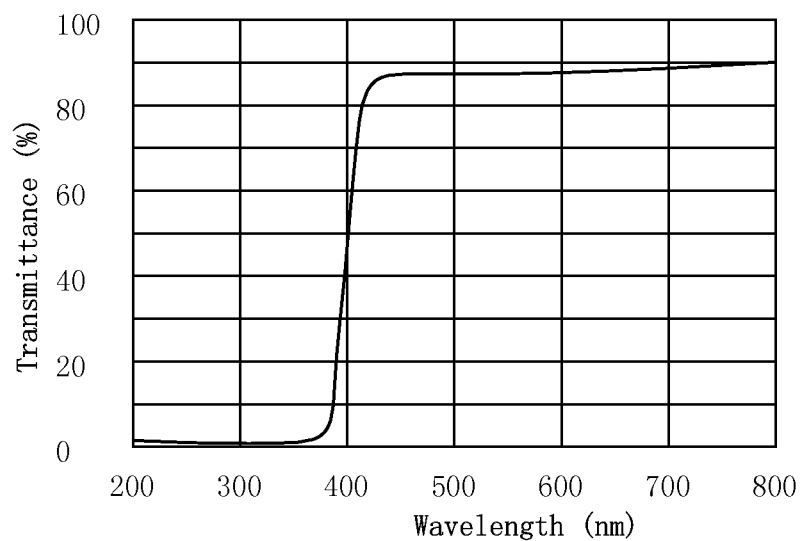
FIG. 5 is a light-transmission characteristic diagram of an ultraviolet light filter film used in the present invention.

Because when the original is irradiated by the ultraviolet light 204, in addition to the exciting light, some reflected light of the ultraviolet light 204 is generated simultaneously. Also, it is possible for the reflected light to pass through the lens to reach the exciting light photosensitive part, and interfere with exciting light signals. So the reflected light of the ultraviolet light 204 is required to be removed. The method adopted in the present embodiment is to coat an ultraviolet light filter film on the surface of the exciting light photosensitive part. This filter film can filter off ultraviolet light without affecting passing of exciting light whose component is visible light. The structure and processing method of the filter film are the same as those of the published China Utility Model Patent No. 2008202390350. The characteristic of the filter film is as shown in FIG. 5, wherein the X-axis is wavelength, and the Y-axis is transmittance. When this filter film is employed, the exciting light photosensitive part can obtain clear image information of exciting light.

Embodiment 2

Figure 6:
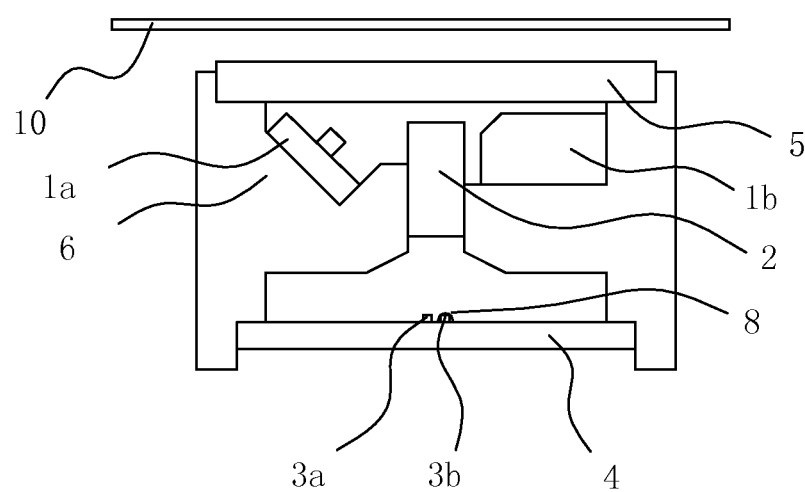
FIG. 6 is another kind of cross-section schematic diagram of the present invention.
Figure 7:
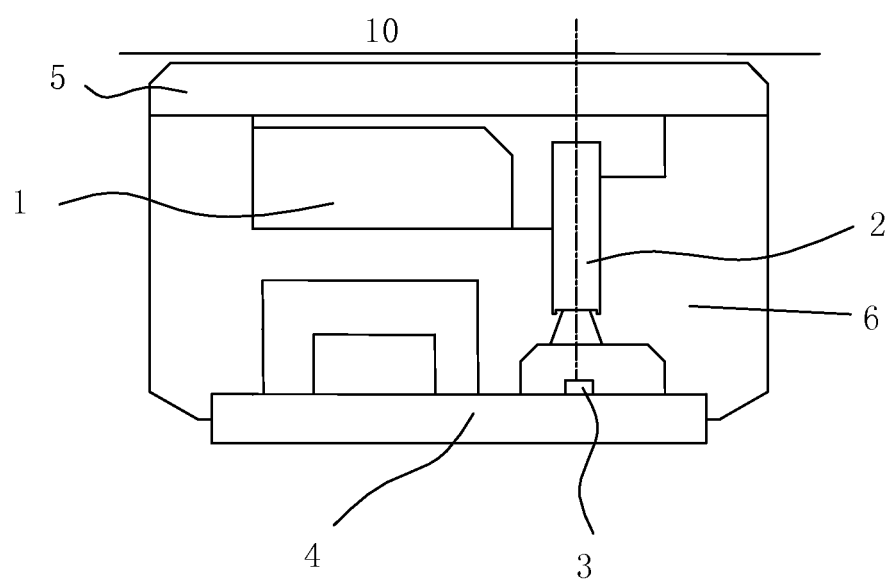
FIG. 7 is a cross-section diagram of an existing image reading apparatus.

In the present embodiment, the full spectrum light source is dividing structurally into two parts. The structural cross-sectional diagram thereof is as shown in FIG. 6. In the present embodiment, the light source consists of 1a and 1b. 1a is the light emission part of ultraviolet light, and 1b is the light emission part of visible light and infrared light. The working principle of the light source is the same with the foregoing.

Embodiment 3

In the above embodiments, an ultraviolet light filter film is coated on the surface of the exciting light photosensitive part. However, a filter film or a filter plate with similar nature can be used in another location of the optical path between the exciting light photosensitive part and the reflected light of to the original.

What is claimed is:
1. A full spectrum recognition image sensor, comprising:
a sensor substrate,
photosensitive parts set on the sensor substrate and arranged in a straight line,
a lens set on an upper portion of the sensor substrate,
a light source set beside the lens,
a framework for accommodating said sensor substrate, said lens and said light source, and
an upper portion of the framework having a light-transmitting plate for carrying an original object,
wherein the light source is a full spectrum light source for emitting light including ultraviolet light, visible light and infrared light, and
the photosensitive parts on the sensor substrate consist of two parts, in which one of the two parts is a reflected light photosensitive part for receiving reflected light information generated by irradiating the original object with the light source, and other of the two parts is an exciting light photosensitive part for receiving exciting light information generated by irradiating the original object with the light source.
2. The full spectrum recognition image sensor according to claim 1, wherein a light emission control is independently performed on light of every wavelength in the full spectrum light source.
3. The full spectrum recognition image sensor according to claim 1, wherein the reflected light information generated by irradiating the original object with the visible light and infrared light is received by the reflected light photosensitive part.
4. The full spectrum recognition image sensor according to claim 1, wherein the exciting light information generated by irradiating the original object with the ultraviolet light is received by the exciting light photosensitive part.
5. The full spectrum recognition image sensor according to claim 1, wherein the reflected light photosensitive part and the exciting light photosensitive part use a common lens unit to receive image information.
6. The full spectrum recognition image sensor according to claim 1 or 5, wherein the reflected light photosensitive part and the exciting light photosensitive part time-divisionally output the received reflected light information and exciting light information respectively.

7. The full spectrum recognition image sensor according to claim 1, further comprising:
    an ultraviolet light filter film coated on a surface of the exciting light photosensitive part.

* * * * *